UNITED STATES PATENT OFFICE.

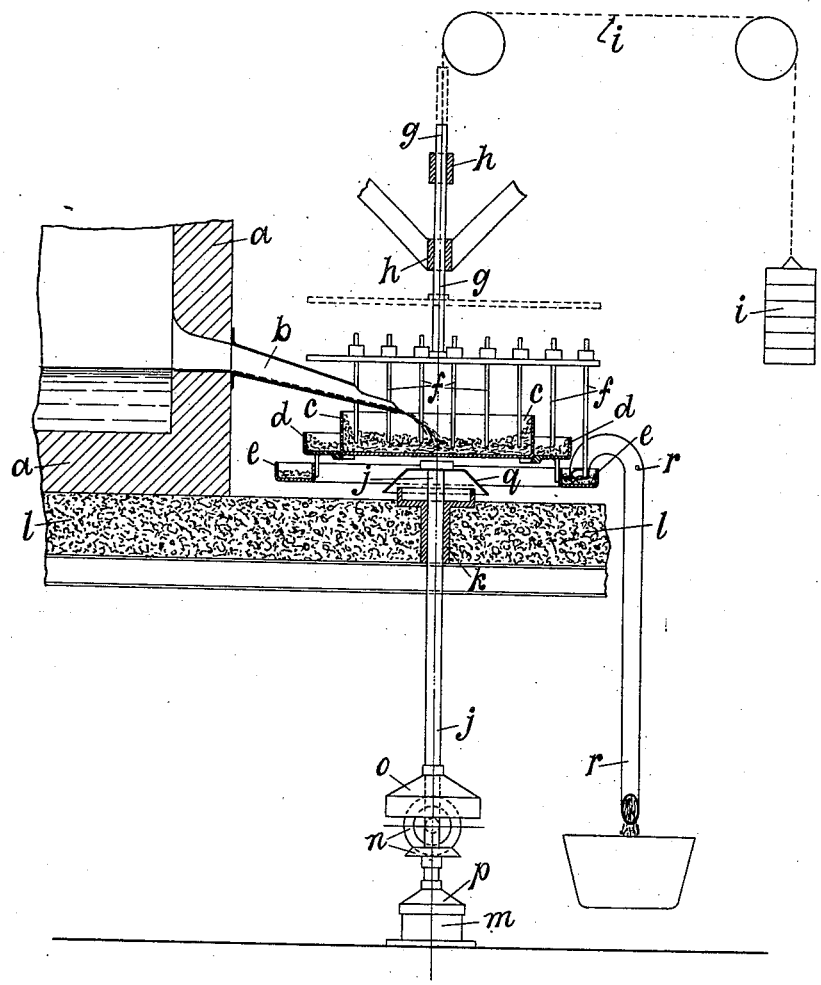

ALFRED WILLIAM BROWN, OF BELFAST, AND JOHN HERBERT WEBSTER, OF CARRICKFERGUS, IRELAND, AND ALFRED GORDON SALAMON, OF LONDON, ENGLAND.

MANUFACTURE OF COMMON SALT.

1,086,020.      Specification of Letters Patent.      Patented Feb. 3, 1914.

Application filed August 16, 1913. Serial No. 785,156.

*To all whom it may concern:*

Be it known that we, ALFRED WILLIAM BROWN, JOHN HERBERT WEBSTER, and ALFRED GORDON SALAMON, subjects of the King of England, residing, respectively, at Textile Building, Belfast, in the county of Antrim, Ireland, United Kingdom of Great Britain and Ireland, Carrickfergus, in the county of Antrim, Ireland, United Kingdom of Great Britain and Ireland, and 1 Fenchurch avenue, London, in the county of Middlesex, United Kingdom of Great Britain, have invented new and useful Improvements in and Connected with the Manufacture of Common Salt, of which the following is a specification.

This invention has reference to the manufacture of common salt (chlorid of sodium), and more particularly the process of manufacturing salt, wherein the salt is first melted by heat, and then in a molten condition, is moved about or stirred while in a body in any suitable way, and prevented from solidifying in large pieces or bulk, and is converted directly from such molten state to the granular form.

The primary object of the invention is to provide an improved mode of, or apparatus to be used in the transforming or converting of the salt direct from the molten state to the granular state, by which this can be accomplished more readily and effectively than heretofore.

The salt in a liquid condition is delivered from a melting furnace or chamber or vessel connected with it, into a revolving pan, and while it is revolving, there is introduced into the pan, prongs or bars, which act upon the salt revolving in the pan as a stationary rake or tined device, which has the effect of stirring or moving it about, and breaking it up, while it is cooling and solidifying; so that when it is solidified, it is in granular form. When it is solidified, it is discharged from the pan in any suitable way, as by a scoop or tool introduced into it, so that by the revolution of the pan it is discharged automatically; but it can be removed in any other way.

According to one mode of carrying out the process, the molten salt is run into the rotating pan or pans continuously, or at short intervals, and is treated in two or three or more stirring operations in sequence; and this may be done by using a plurality of concentric pans, or a series in line, one below the other, and by causing the salt from the first, into which the molten salt from the furnace flows, to flow or pass over into the second; and if a third is used, from the second into the third, and stirring the salt in all of them.

In some cases, the salt, before being introduced into the revolving pan, is subjected to a preliminary treatment, namely, it is cooled more or less in a hot chamber forming part of, or connected with the melting furnace, and in which it may be more or less stirred or moved about; and from this chamber, in the partly cooled, but not solidified form, the salt is scooped or moved into the finishing pan or other vessel or apparatus, where it is completely granulated or broken up, and in this final and finishing granulation or breaking up action, mechanical means may be employed.

In the drawings hereto annexed, there is illustrated an apparatus for operating upon the molten salt of the character above described.

Referring to the drawings, *a* represents the furnace; *b* is the running off aperture and spout, through which the molten salt is passed from it into the pans; *c*, *d* and *e* are the revolving pans; and *f* represents the pronged or tined devices which are adapted to be lowered into and removed from the pans *c*, *d*, *e*.

In the arrangement shown, three concentric pans *c*, *d*, *e*, are used, the salt passing from the furnace into the middle of the first, and overflows into the second which is at a lower level, and then overflows from this into the third, which is below the second; and in all of them, the rakes or pronged devices *f* are used, and act upon, and stir, and keep moving the salt.

As stated, the molten salt is preferably run into the center of the first or middle pan *c*, in a continuous small stream, and the salt from the center, in its movement outward, gradually crystallizes into grains or crystals by being stirred and acted upon by the rakes or prongs *f*; and in so doing moves by centrifugal force or the action of the rakes *f*, toward the edge of the pan, which it mounts and trickles over all around, or at one spot by the insertion of a special rake, or scoop, or the like. In the second pan the crystallizing or granulating action is continuous, while in the third the crystallization or granulation is complete; the salt, overflowing from one pan to the other in the manner above described.

The salt may be taken from No. 3 pan either direct to the store, or passed directly through screens, when it is in a condition for sale and use.

The salt may be taken from the pan *e* by a scoop, *r*, the scoop end of which is introduced into the pan, and by means of which, and the rotation of the pan, the salt will be automatically discharged from the pan.

The pronged devices *f* may each consist of a cross-head, having vertically adjustable prongs in them; the cross-head being carried from a vertical shaft *g* supported and guided as regards the lateral movement, by the stationary bearings *h*.

The devices *f* are balanced vertically, and are adapted to be moved up and down by means of chain or rope, and weights *i*, so that they can be moved into and out the pans or vertically in relation thereto, as and when desired.

The pans are supported on the upper end of the vertical shaft *j*, which passes vertically downward through an upper bearing *k* in the floor *l*; and at its lower end fits into and works in a footstep bearing *m*. The shaft *j* is driven from below the floor *l*; the driving gear in the case shown, consisting of bevel wheels *n* near the lower floor or ground level; and over this gearing, a hood *o* is fixed to prevent dirt or other matters falling in it; while also over the footstep bearing *m*, there is a similar hood *p*, both of which hoods are fixed on the shaft *i*. Also, around the top of the shaft *j*, a hood is fixed, and serves as a guard to keep away from the bearing *k*, dirt and other matter; and also to help to keep it cool and guarded from the heat of the furnace.

By this construction and arrangement, all the bearings and working parts are kept away from the great heat of the furnace and molten salt, and are thereby prevented from having damage done by it.

The pans may be of any suitable metal, and if desired they may be lined with refractory fire brick or material.

When the pan is being cleaned, or not making salt, the rake is raised out of it.

What is claimed is:—

1. The herein described process of manufacturing common salt (chlorid of sodium) in granular form from the molten state, consisting in subjecting the molten salt in a body, while cooling, to centrifugal action and simultaneously stirring same so as to form finely divided crystals, substantially as described.

2. The herein described process of manufacturing common salt (chlorid of sodium) in granular form from the molten state, consisting in subjecting the molten salt in a body, while cooling, to a series of successive steps, in each of which the mass is moved by centrifugal action, and simultaneously subjected to a positive stirring action so as to form finely divided crystals, substantially as described.

3. The herein described process of manufacturing common salt (chlorid of sodium) in granular form from the molten state, consisting in passing the molten salt into a receptacle or receptacles and there subjecting the molten salt in a body to centrifugal action, while cooling, and simultaneously mechanically stirring said mass so as to form finely divided crystals, substantially as described.

In testimony whereof we have signed our names to this specification in the presence of two subscribing witnesses.

ALFRED WILLIAM BROWN.
JOHN HERBERT WEBSTER.
ALFRED GORDON SALAMON.

Witnesses to the signatures of Alfred William Brown and John Herbert Webster:
JOSEPH DOBSON BUTTS,
WILLIAM G. BARCROFT, Jr.

Witnesses to the signature of Alfred Gordon Salamon:
JOHN C. SANDERS,
T. WINTNER.

---

Copies of this patent may be obtained for five cents each, by addressing the "Commissioner of Patents, Washington, D. C."